United States Patent [19]

Kato et al.

[11] 4,362,784
[45] Dec. 7, 1982

[54] PACKING MATERIALS FOR MOLTEN CONTENTS

[75] Inventors: Takeo Kato, Ohmiya; Nobuyoshi Fukuda, Tokyo, both of Japan

[73] Assignee: Toppan Printing Co., Ltd., Tokyo, Japan

[21] Appl. No.: 143,467

[22] Filed: Apr. 24, 1980

[51] Int. Cl.$^3$ .............................................. B32B 9/00
[52] U.S. Cl. .................................... 428/340; 156/320; 426/130; 426/410; 428/348; 428/349; 428/463; 428/483; 428/484; 428/485; 428/500; 428/510; 428/518; 428/522; 525/301; 525/309
[58] Field of Search ................ 156/320; 428/520, 522, 428/523, 484, 348, 349, 340; 426/127, 126, 129, 130, 410, 414, 389, 811; 525/301, 309

[56] References Cited

U.S. PATENT DOCUMENTS

| | | | |
|---|---|---|---|
| 3,483,076 | 12/1969 | Resz et al. | 156/320 |
| 3,652,362 | 3/1972 | Odagiri | 156/320 |
| 3,868,433 | 2/1975 | Bartz et al. | 525/72 |
| 3,908,070 | 9/1975 | Marzolf | 428/523 |
| 4,247,584 | 1/1981 | Widiger et al. | 428/520 |
| 4,252,846 | 2/1981 | Romesburg et al. | 428/520 |

FOREIGN PATENT DOCUMENTS 55-84659 6/1980 Japan .................................. 428/522

Primary Examiner—George F. Lesmes
Assistant Examiner—E. Rollins Buffalow
Attorney, Agent, or Firm—Charles E. Pfund

[57] ABSTRACT

A packing material for molten contents is composed of a base film coated with a resin (C) containing an ethylenevinyl acetate copolymer (A) having a vinyl acetate content of approximately 5 to 40 percent by weight and a copolymer (B) of either ethylene or an alpha-olefin with an unsaturated carboxylic acid or its anhydride, having a molecular weight of approximately 2,000 to 20,000, and having the following formula:

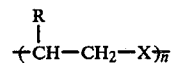

(wherein R stands for a hydrogen atom or an alkyl group having between 1 and 98, carbon atoms, inclusive, and X stands for a residue of an unsaturated carboxylic acid or its anhydride), in an (A) to (B) ratio between approximately 99:1 and 60:40 by weight or coated with the resin (C) to which a tackifying agent (D) is added in an amount between approximately 3 and 30 percent by weight.

5 Claims, 5 Drawing Figures

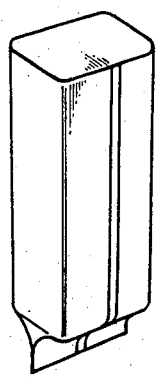
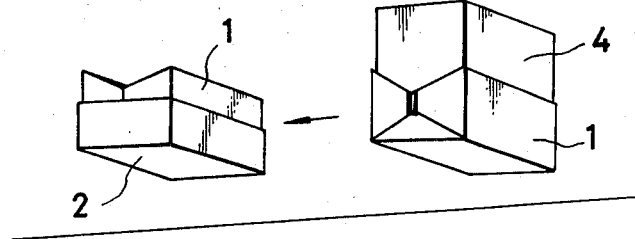

PACKING MATERIALS FOR MOLTEN CONTENTS

BACKGROUND OF THE INVENTION

Generally, packing materials for use in packing and wrapping contents in a molten state are required to meet the following conditions, because packing forms influence packing materials.

(1) Contents to be packed may be sealed merely by application of heat or contact sealed by pressure.

(2) The surface of a resin layer covering packing materials may be melted by the heat of the contents to be packed and can adhere to the contents to prevent bacteria, mold or the like from penetrating and infecting the contents.

(3) Packing materials are provided with cold-resistant, oil-resistant and waterproofing properties.

(4) Packing materials may be cut easily by a knife or the like.

(5) Packing materials may be folded easily.

A method of packing and wrapping melted contents will be illustrated by taking processed cheese as an example.

Generally, among processed cheeses, a majority of carton-packed cheese of 150 to 400 grams for domestic use are packed and wrapped in a molten state. FIG. 1 shows a cheese package in which a piece of cheese, which was wrapped up tightly with a material (1) for packing, is packed in a carton consisting of a cardboard cover (2) and a receptacle (3). A method for packing a piece of cheese is illustrated in FIG. 2 in which a given amount of cheese, which was heated to about 75° to 85° C. and is in a molten state, is placed on the material (1) for packing. The material (1) is then folded within the carton cover (2). The unfolded portions of the material (1) are then folded so as to adhere to the molten mass of cheese, and the package of cheese is inserted into the receptacle (3). The carton which wrapped up the given amount of cheese is then pressed from the top and bottom, and from the right and left, to provide heat sealing and adhesion so that the packing is finished. Another mode of folding the material (1) for packing cheese around the carton cover (2) is shown in FIG. 3, where the side portions of the cheese packing material (1) are contact bonded together by means of a pressure sealer, as shown in FIG. 4, and then covered with a carton cover.

Since a molten mass of cheese is packed and wrapped in a manner as described above, the sealable layer of the cheese packing material need only be contact sealed or sealed by the heat of the mass of cheese to be packed, in order to be adequately sealed. The sealable layer of the cheese packing material is also required to possess a surface smooth enough for the molten mass of cheese to flow into every corner or end of the material folded around the cover. If a space were formed at a corner portion of the package, the air present therein would cause mold to grow. When a package of cheese is served, the packed cheese is usually cut by a knife without peeling off the packing material, so the material should be easy to cut with a knife.

Materials for packing sweet jelly of bean pastes in a molten state are mainly composed of paper, aluminum foil and polyethylene. FIG. 5 illustrates a tubular body formed by sealing together the side portions of a sheet of material, and then heat sealing the bottom portion thereof. A molten mass of sweetened bean paste at 80° to 95° C. is poured into the bottom-closed tubular body, and then the opening thereof is heat sealed in the same manner as the bottom portion.

This type of packing material contains aluminum foil so as to provide a prolonged preservation period of about one year. However, this manner of packing may allow an air pocket to be formed in the molten contents at the upper end of the package. Furthermore, this mode of heat sealing damages the shape of the top and bottom portions of the packed contents, impairing the commodity value. Packing materials containing aluminum foil do not allow the contents to be seen, so that the characteristic appearance of sweetened bean pastes, sweet jelly of Japanese chestnuts, adzuki bean pastes, and the like cannot be displayed.

Thus, the sealable layers of materials for packing contents such as cheese or sweetened bean pastes in a molten state are required to have different properties than sealable layers of packing materials for general use.

BRIEF DESCRIPTION OF THE PRIOR ART

Heretofore, as shown in Japanese Patent Publication No. 5,447/1957, material for packing cheeses are generally composed of a cellophane or a moisture-proof cellophane coated with a mixture of polyisobutylene, lower molecular weight polyethylene, or paraffin wax, microcrystalline wax, or the like.

Japanese Patent Application Laid-Open No. 55,976/1973 illustrates packing materials in which a base material is coated with a resin mixture of vinyl acetate-ethylene copolymer, wax and paraffin wax. Japanese Patent Publication No. 5,763/1973 illustrates coating materials containing petroleum wax as the major component mixed with ethyl acrylate or the like and rosin or rosin ester. U.S. Pat. No. 3,868,433 further illustrates coating resins having improved adhesion to metals, in which $C_2$-$C_8$ polyolefins, graft modified by an unsaturated carboxylic acid, are formulated with ethylene-vinyl acetate copolymers, and the resultant resins are further mixed with an elastomer and/or a viscosity increasing agent.

These conventional packing materials and coating resins, however, do not satisfy all of the necessary requirements as mentioned above.

For example, when the packing materials disclosed in Japanese Patent Publication No. 5,447/1957 are employed to pack a molten mass of cheese, a portion of the sealable layer thereof may melt and adhere to the surface of the cheese mass, so that they may heat seal the molten cheese merely by the heat from the cheese and contact seal the cheese to be packed.

The mixing of substances having different softening points or melt viscosities, such as polyisobutylene, lower molecular weight polyethylene, paraffin wax or microcrystalline wax, requires a special blender. Furthermore, this resin mixture requires a special coating device because of its high melt viscosity.

These resins, when coated, may stick when pressure is applied or temperatures are elevated, so that management of the processing temperature, manipulation of take-up operations, or the like has been complicated. Moreover, this resin mixture requires a coating to be applied in the amount of 60 to 80 grams per $m^2$ in order to provide sufficient sealability. Where these packing materials are employed to pack processed cheeses as explained hereinabove, they have the disadvantage of being forced out of the sealed portions of the package when too much pressure is applied, and adhering to the surface of the receptacle. Moreover, when the packing material is withdrawn from the packed cheese mass, there is the disadvantage that the packing material may be torn away, leaving a remnant on the cheese surface.

SUMMARY OF THE INVENTION

Accordingly, it is an object of the present invention to provide packing materials with improved packing performance.

It is another object of the present invention to provide packing materials with enhanced packing performance suitable for packing and wrapping contents in a molten state.

It is a further object of the present invention to provide packing materials having a sealable layer which may become molten by only the heat of the contents to be packed, or maybe contact sealed by pressure.

It is a still further object of the present invention to provide packing materials which have cold-resistant, oil-resistant and waterproofing properties, which are cut easily by a knife or the like, and are folded.

It is a still further object of the present invention to provide packing materials in which coating resins constituting the resin layer thereof are mixtures of ethylene-vinyl acetate copolymer having a particular vinyl acetate content with a copolymer of ethylene or alpha-olefin with an unsaturated carboxylic acid or its anhydride in a particular weight ratio of the ethylene-vinyl acetate copolymer to the latter copolymer.

It is a still further object of the present invention to provide packing materials in which a particular viscosity increasing agent is added at a particular weight to the above resin.

BRIEF DESCRIPTION OF THE DRAWINGS

FIG. 2 and FIG. 3 are illustrations of methods for forming a package;

FIG. 4 is an illustration of a contact sealing process; and

FIG. 5 is an illustration of a conventional package of adzuki bean jelly.

Figure 1:
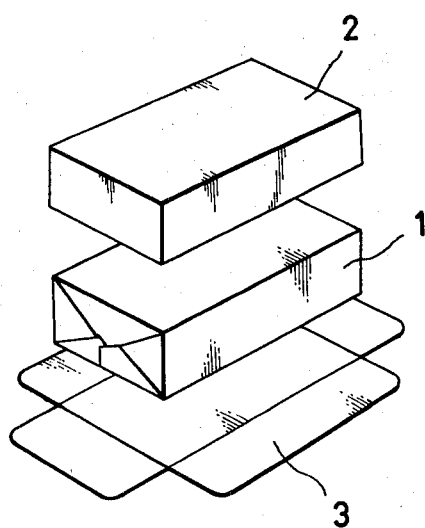
FIG. 1 is an illustration showing a package of processed cheese.
Figure 2:
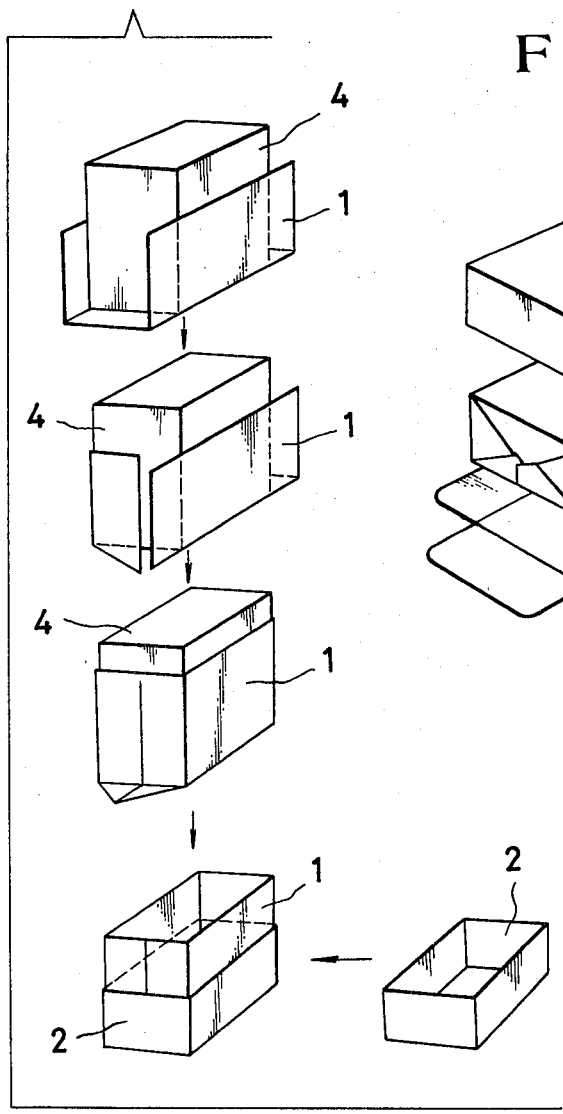

In the drawings, the reference numeral 1 denotes the packing material, 2 denotes a covering, 3 denotes a receptacle and 4 denotes a mold around which the packing material is folded and formed.

DETAILED DESCRIPTION OF THE INVENTION

The present invention relates to packing materials having a coated resin layer which may be prepared by extrusion coating a coating resin onto a base material selected from the group of cellophane, aluminum foil, plastic film and their composite materials, and satisfying all of the above-mentioned five requirements for packing materials to be used in packing and wrapping contents in a molten state.

The coating resin to be used for the resin layer of the packing material of the present invention may include a mixture of an ethylene-vinyl acetate copolymer (A) having a vinyl acetate content of about 5 to 40 percent by weight and a copolymer (B) of ethylene or of an alpha-olefin with an unsaturated carboxylic acid or its anhydride, in an (A) to (B) ratio between approximately 99:1 and 60:40 by weight.

A tackifying agent may be added in the amount of approximately 3 to 30 percent by weight with respect to a resin (C) composed of a mixture of the ethylene-vinyl acetate copolymer (A) having the vinyl acetate content of approximately 5 to 40 percent by weight with the copolymer (B) of ethylene or alpha-olefin with the unsaturated carboxylic acid or its anhydride in an (A) to (B) ratio between about 99:1 and 60:40 by weight. The addition of the viscosity increasing agent can improve the heat sealability of the packing material of the present invention and permits sealing merely by the application of pressure at ambient temperatures.

Furthermore, to the resin (C) or a mixture of the resin (C) with the tackifying agent, may be added a synthetic wax or a natural wax such as paraffin wax, microcrystalline wax, lower molecular weight polyethylene wax and carnauba wax, in the amount of about 1 to 10 percent by weight with respect to the above resin or mixture. When this resin is employed as a coating resin for the packing material of the present invention, it can prevent the packing material from sticking to a cooling roll upon extrusion processing and or during winding-up operations.

When the vinyl acetate content of the ethylene-vinyl acetate copolymer (A) is below 5% by weight, heat sealability under only heat of the molten contents to be packed is inadequate. Compatibility with the copolymer (B) of ethylene or alpha-olefin with the unsaturated carboxylic acid or its anhydride becomes unsatisfactory, and the materials adapts poorly to the extrusion process. A vinyl acetate content above 40% by weight result in poor extrusion coating, a low yield, and poor packing workability.

In the copolymer (B) of ethylene or alpha-olefin with the unsaturated carboxylic acid or its anhydride, the ethylene or the alpha-olefin may be an ethylenic polymer which is represented by the general formula: $C_nH_{2n}$ (wherein n is an integer between 2 and 100) and has a terminal $C\!=\!C$ double bond. Alpha-olefins within the range from 20 to 40 are preferred. The unsaturated carboxylic acid may be selected from the group of acrylic acid, methacrylic acid, fumaric acid, and itaconic acid.

The molecular weight of the copolymer (B) to be used for the resin layer of the packing material according to the present invention is preferably in the range of approximately 2,000 to 20,000. In this range, the copolymer (B) provides good compatibility with the ethylene-vinyl acetate copolymer, improved flowability of the molten contents to be packed, and enhanced adhesion to the packed contents when cooled and solidified. The melting point may range from 70° to 80° C., and is preferably between 72° and 76° C.

Table 1 shows a comparison between composite materials having a resin layer with no viscosity increasing agent added, and composite materials having a resin layer with a viscosity increasing agent added. The compositions of the packing materials used here are as follows:

System having no tackifying agent:

| | |
|---|---|
| Base film: polyester, 12 microns thick | |
| Resin layer: 40 microns thick | |
| Ethylene-vinyl acetate copolymer (vinyl acetate content: 28 wt. %) | 80 parts |
| Copolymer of alpha-olefins of $C_{30}H_{60}$  $C_{35}H_{70}$ | |

-continued

| | |
|---|---|
| with maleic anhydride | 20 parts |
| System having a tackifying agent: | |
| Base film: polyester, 12 microns thick | |
| Resin layer: 40 microns thick | |
| Ethylene-vinyl acetate copolymer (vinyl acetate content: 28 wt. %) | 80 parts |
| Copolymer of alpha-olefins of $C_{30}H_{60}$ $C_{35}H_{70}$ with maleic anhydride | 20 parts |
| Aliphatic hydrocarbon resin | 20 parts |

TABLE 1

| Resin system | Sealing portion | Heat Sealing Strength By Centinel Heat Sealer (pressure: 30 psi) g/15 mm | | | Contact Sealing Strength At Ambient Temp. g/15 mm | |
|---|---|---|---|---|---|---|
| | | 80° C. 1 sec. | 90° C. 1 sec. | 100° C. 1 sec. | 300 kg/cm³ (under pressure) | 600 kg/cm³ (under pressure) |
| System with no viscosity increasing agent | Resin layer against resin layer | 125 | 2000 | 2800 | 0 | 0 |
| | Sealed to moisture-proof cellophane* | 550–600 | 900–1000 | 1350–1400 | 0 | 0 |
| System with viscosity increasing agent | Resin layer against resin layer | 1500 | 2400 | 2900 | 250–300 | 800–900 |
| | Sealed to moisture-proof cellophane | 700–750 | 1000–1050 | 1500–1600 | 0 | 0 |

*Moisture-proof cellophane: polyvinylidene chloride coated cellophane

As Table 1 indicates, the addition of the viscosity increasing agent enabled contact sealing between the resin layers at ambient temperature by a contact sealer. Thus, packing materials having such a resin layer may be used for various packing forms.

The viscosity increasing agent may include a member selected from an aliphatic hydrocarbon resin, an aromatic hydrocarbon resin, a copolymeric hydrocarbon resin and a mixture thereof.

The viscosity increasing agent also may include a resin in which either a rosin derivative or a modified rosin derivative has been added to the above-mentioned resin.

The aliphatic hydrocarbon resin referred to herein may be a resin obtainable by polymerization using as raw materials $C_4$–$C_5$ fractions containing monomers such as pentenes, isoprene, piperylene (1,3-pentadiene) or the like produced by pyrolysis of petroleum naphtha. The aromatic hydrocarbon resin referred to herein may be a resin obtainable by polymerization of styrenes, indenes or the like which are thermal decomposition products of pyrolysis of petroleum naphtha, with hydrocarbons mainly having 9 carbon atoms or a pure monomer such as alpha-methylstyrene, vinyl toluene or the like. The copolymeric hydrocarbon resin referred to herein is a resin obtainable by polymerization of monomers, each from the above-mentioned aliphatic and aromatic hydrocarbon resins.

The rosin derivatives and modified rosin derivatives may be rosin or a modified rosin obtainable by hydrogenation, disproportionation or dimerization of rosin, or an esterified product formed by esterification of the above-mentioned modified rosin with an alcohol such as methanol, glycols, glycerin, pentaerythritol or the like. These derivatives possess improved properties, having no odors associated with pine resins or yellow colorings upon heating, which are not suitable for packing materials for foods.

The resin to be used for the resin layers of the packing material of the present invention may be easily pelletized by mixing it in a molten state by means of a screw extruder or Bumbury's mixer. The pellets thus obtained may be extrusion coated by means of an extruder for general coating use, without slipping, surging or causing cracks.

Resin layers of conventional materials for packing cheese have been formed by melting a resin mixture and then coating the molten mixture onto a base material, so that the base material is limited to cellophane or moisture-proof cellophane both of which have remarkable heat stability. In conventional methods, management of the coating amounts of the resin mixture is so difficult that the speed of coating is slow.

On the other hand, resin layers of the packing material of the present invention may be formed by extrusion coating, so that plastic films and other composite materials as well as cellophanes may be used. Furthermore, this permits easy adjustment of the coating amounts by regulating the extruding amounts and the coating speed.

Resin layers in accordance with the present invention can provide satisfactory sealability and adhesion with an application of coating amounts of 20 to 45 grams per m², less than half the conventional application amounts. The resin layers also may satisfactorily seal the contents to be packed by the heat transmitted from the contents or by application of pressure for packing, without forcing the resin out of the sealed portions. Furthermore, the use of the resin layers for the packing material in accordance with the present invention can solve the problem associated with resin layers sticking to the packed contents upon opening of a package due to weak adhesion of the resin on the resin layer of the packing material.

The packing material according to the present invention containing the composition as the resin layer possesses remarkably good performance with molten contents. The composition in accordance with the present invention may be used as low temperature heat sealing materials.

That is, the composite packing material according to the present invention can be favorably used as heat sealing packing material, and permits heat sealing at lower temperatures than in the case of a packing material having a coating of a low density polyethylene, polypropylene or an ethylene-vinyl acetate copolymer.

Table 2 shows a comparison of the packing material according to the present invention with other packing materials.

TABLE 2

| Material To Be Sealed | Heat Sealing Material | Heat Sealing Strength By Centinel Heat Sealer (Pressure: 30 psi) g/15 mm | | | | |
|---|---|---|---|---|---|---|
| | | 80° C. 1 sec. | 100° C. 1 sec. | 120° C. 1 sec. | 140° C. 1 sec. | 160° C. 1 sec. |
| Low Density Polyethylene | Composition (1)*1 | 0 | 180 | 450 | 2800 | 3500 |
| | Composition (2)*2 | 20 | 260 | 630 | 2800 | 3500 |
| | Low density | 0 | 10 | 100 | 2100 | 3500 |

TABLE 2-continued

| Material To Be Sealed | Heat Sealing Material | Heat Sealing Strength By Centinel Heat Sealer (Pressure: 30 psi) g/15 mm | | | | |
|---|---|---|---|---|---|---|
| | | 80° C. 1 sec. | 100° C. 1 sec. | 120° C. 1 sec. | 140° C. 1 sec. | 160° C. 1 sec. |
| Plypropylene | polyethylene Polypropylene | 0 | 0 | 0 | 40 | 80 |
| | Ethylene-vinyl acetate copolymer*³ | 0 | 20 | 210 | 2400 | 3500 |
| | Composition (1)*¹ | 0 | 100 | 260 | 1900 | 2500 |
| | Composition (2)*² | 0 | 110 | 310 | 2000 | 2700 |
| | Low density polyethylene | 0 | 0 | 10 | 40 | 100 |
| | Polypropylene | 0 | 0 | 0 | 50 | 450 |
| | Ethylene-vinyl acetate copolymer*³ | 0 | 0 | 20 | 40 | 140 |
| Polyvinyl chloride | Composition (1)*¹ | 700 | 960 | 1400 | 2300 | 2900 |
| | Composition (2)*² | 700 | 1000 | 1520 | 2400 | 3050 |
| | Low density polythylene | 0 | 0 | 150 | 250 | 480 |
| | Polypropylene | 0 | 0 | 0 | 0 | 120 |
| | Ethlene-vinyl acetate | 40 | 180 | 400 | 1100 | 1350 |
| High Impact Polystyrene | Composition (1)*¹ | 0 | 120 | 310 | 650 | 1100 |
| | Composition (2)*² | 90 | 240 | 570 | 840 | 1240 |
| | Low density polyethylene | 0 | 0 | 0 | 30 | 50 |
| | Polypropylene | 0 | 0 | 0 | 0 | 20 |
| | Ethylene-vinyl acetate copolymer*³ | 0 | 0 | 50 | 290 | 700 |
| Polyvinylidene chloride coated cellophane | Composition (1) | 600 | 1400 | 2100 | 2200 | 2250 |
| | Composition (2) | 750 | 1600 | 2300 | 2350 | 2350 |
| | | 0 | 0 | 50 | 190 | 270 |
| | Low density polyethylene | | | | | |
| | Polypropylene | 0 | 0 | 0 | 10 | 200 |
| | Ethylene-vinyl acetate copolymer | 30 | 180 | 520 | 1050 | 1600 |

*¹Composition (1): Composition with no viscosity increasing agent of Table 1
*²Composition (2): Composition with a viscosity increasing agent of Table 1
*³Ethylene-vinyl acetate copolymer: vinyl acetate content, 28% by weight As indicated in Table 2, it is found that the compositions according to the present invention has extraordinarily lower heat sealing initial temperatures than other conventional heat sealing materials. The compositions in accordance with the present invention may be applied to more base materials than the conventional compositions, in particular, have remarkable heat sealability to polyvinyl chloride and polyvinylidene chloride coated film.

The following examples will illustrate the present invention in more detail.

EXAMPLE 1

Packing materials were prepared by extrusion coating a resin mixture having the following composition at about 150° C. onto polyvinylidene chloride coated cellophane having a thickness of 25 microns to form a resin layer.

| Ethlene-vinyl acetate copolymer (Vinyl acetate content: 33% by weight) (Melt Index, 30 g/10 minutes) | 90 parts |
|---|---|
| Coloplymer or $C_{30}H_{60}$—$C_{40}H_{80}$ alpha-olefins with Maleic anhydride | 10 parts |

The packing materials thus prepared were used to pack a molten mass of cheese at 85° C. in the manner described hereinabove, and pressure was applied to the packed contents from the top and bottom, and from the right and left for about one hour. After the packed contents were allowed to stand in a refrigerator for 2 hours, it was found that adhesion between the packing material and the packed cheese was good, and that the package for processed cheese had a a greater transparency than conventional ones. The package could be cut easily and cleanly with a knife and without the packing material slipping when the package was sliced.

The sealability of this package was investigated by dipping it into a 0.3% solution of methylene blue in an aqueous methanol solution (water/metanol=1/1) for 5 hours. Thereafter, the package was opened, and it was observed that the packaged processed cheese was not colored with methylene blue. After being stored in a thermo-hygrostat at 20° C. and 50% relative humidity for 2 months, the package was investigated for mold growth and reduction of water content in the packed cheese. It was found that no mold grew, and the water reduction was slight, so that these results were satisfactory.

EXAMPLE 2

Packing material was prepared by extrusion coating a composition having the following ingredients onto a polyethylene terephthalate film (12 microns thick) coated with polyvinylidene chloride to form a resin layer.

| Ethylene-vinyl acetate copolymer (Melt Index, 15 g/10 minutes) | 70 parts |
|---|---|
| Copolymer of $C_{20}H_{40}$—$C_{30}H_{60}$ alpha-olefins with fumaric acid | 15 parts |
| Copolymeric hydrocarbon resin (Softening point, 80° C.; molecular weight 750) | 9 parts |
| Hydrogenated rosin glycerin ester (Softening point, 78° C.) | 6 parts |

The packing material thus prepared was used to pack a mass of molten sweetened bean paste at 105° C., which was then pressed for 1 hour from the top and bottom and from the right and left. After being stored in a refrigerator for 2 hours, neither the leakage or oozing of the packed paste was found, and the transparency of the packing material was so good that a package with high commodity value was provided. The package could also be easily cut with a knife. Storage in a thermo-hygrostat at 25° C. and 60% relative humidity for 6 months did not change the color of the packed paste or its taste. Further, no reduction in the moisture content was observed.

As has been previously mentioned, the present invention can provide packing materials for packing and wrapping molten contents by applying to a base material a resin layer composed of an extrusion coatable composition consisting of an ethylene-vinyl acetate copolymer and a copolymer of ethylene or an alpha-olefin with an unsaturated carboxylic acid or its anhydride, or an extrusion coatable composition consisting of a mixture of a viscosity increasing agent with this above-mentioned ethylene-vinyl acetate copolymer and the copolymer of ethylene of alpha-olefin with the unsaturated carboxylic acid or its anhydride. The compositions in accordance with the present invention may be coated in smaller amounts than conventional coating materials, and they provide the properties and performance needed by packing materials for packing and wrapping contents in a molten state. The compositions may also be applied to a greater variety of base material films than conventional coating compositions by means of equipment for general use without requiring special formulating equipment and coating apparatus.

Consequently, compositions and resin layers of conventional packing materials have been varied depending upon the kind and the packing modes of the molten contents to be packed. The composite packing materials according to the present invention, however, can be used for a wide variety of contents to be packed, allow a great reduction in cost with respect to raw materials and processing, and provide performance which conventional ones do not.

What is claimed is:

1. A packing material for molten contents at a temperature of 75° to 95° C. comprising a base material film on which is extrusion-coated with 20 to 45 g/m² of a resin (C) comprising an ethylene-vinyl acetate copolymer (A) having a vinyl acetate content of approximately 5 to 40 percent by weight and a copolymer (B) of ethylene or an alpha-olefin with an unsaturated carboxylic acid or its anhydride, said copolymer (B) having a molecular weight of approximately 2,000 to 20,000 and a melting point of 70° to 80° C., and having the following general formula:

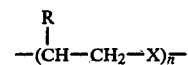

(wherein R stand for a hydrogen atom or an alkyl group having between 1 and 98 carbon atoms, inclusive, and X stands for a residue of an unsaturated carboxylic acid or its anhydride), in an (A) to (B) ratio between approximately 99:1 and 60:40 by weight.

2. A packing material according to claim 1, wherein said resin (C) is admixed with a tackifying agent (D) in a (C) to (D) ratio between approximately 97:3 and 70:30 by weight.

3. A packing material according to claim 2, wherein said tackifying agent (D) is selected from the group consisting of an aliphatic hydrocarbon resin, an aromatic hydrocarbon resin, a copolymeric hydrocarbon resin or a mixture thereof.

4. A packing material according to claim 2, wherein said tackifying agent (D) is selected from the group consisting of an aliphatic hydrocarbon resin, an aromatic hydrocarbon resin and a copolymeric hydrocarbon resin, or is a mixture of one or more of these resins with a rosin derivative or a modified rosin derivative.

5. The packing material according to claims 1 and 2, wherein said resin (C) or a mixture of said resin (C) and said tackifying agent in an amount between approximately 90 and 99 percent by weight is admixed with a synthetic wax or a natural wax in an amount between approximately 1 and 10 percent by weight.

* * * * *

UNITED STATES PATENT AND TRADEMARK OFFICE
CERTIFICATE OF CORRECTION

PATENT NO. : 4,362,784
DATED : December 7, 1982
INVENTOR(S) : Takeo Kato and Nobuyoshi Fukuda It is certified that error appears in the above—identified patent and that said Letters Patent is hereby corrected as shown below:

Column 4, line 67, and column 5, line 10:

change" $C_{30}H_{60}C_{35}H_{70}$ " to -- $C_{30}H_{60}\sim C_{35}H_{70}$ --

Column 8, line 17, change " had a a greater " to --had a greater--

Signed and Sealed this

Sixteenth Day of August 1983

[SEAL]

Attest:

GERALD J. MOSSINGHOFF

Attesting Officer · Commissioner of Patents and Trademarks